United States Patent [19]

Weigel et al.

[11] 4,382,594
[45] May 10, 1983

[54] DEVICE FOR DISPENSING SHEET MATERIAL OUT OF A CLOSED RECEPTACLE

[75] Inventors: Peter Weigel, Bo.-Dörenhagen; Rudolf Schmeykal, Paderborn, both of Fed. Rep. of Germany

[73] Assignee: Nixdorf Computer AG, Fed. Rep. of Germany

[21] Appl. No.: 244,513

[22] Filed: Mar. 16, 1981

[30] Foreign Application Priority Data

Apr. 14, 1980 [DE] Fed. Rep. of Germany ....... 3014173

[51] Int. Cl.³ .............................................. B65H 5/02
[52] U.S. Cl. ........................................ 271/272; 271/7
[58] Field of Search ................. 271/6, 7, 34, 272, 273, 271/274, 275; 209/534; 194/1 A, 1 B, 1 K, 4 E

[56] References Cited

U.S. PATENT DOCUMENTS 3,108,680 10/1963 Ellis ................................. 194/4 E X
3,132,737 5/1964 Moon ............................. 194/4 E X
4,251,010 2/1981 Schmeykal ...................... 209/534 X

*Primary Examiner*—Richard A. Schacher
*Attorney, Agent, or Firm*—Krass, Young & Schivley

[57] ABSTRACT

A security-oriented conveyor system for currency dispensers and the like comprising a pair of conveyor belts which lie in facial contact with one another to grip one or more sheets of currency between them and convey same through a downwardly inclined slot in a vault wall. Conveyor rollers are located adjacent the slot openings to prevent tampering.

15 Claims, 3 Drawing Figures

DEVICE FOR DISPENSING SHEET MATERIAL OUT OF A CLOSED RECEPTACLE

DESCRIPTION

Technical Field

The invention relates to a device for dispensing sheet material from a closed receptacle, especially for dispensing certificates through the wall of a safe by means of a conveyor arrangement which conveys the sheet material from a receiving place inside the receptacle through a wall opening to a removal place outside the receptacle.

Background Art

Devices for dispensing sheet material are extensively used in machines which process sheet material, for example, in copying and sorting machines. Moreover, devices of this type are also used in automatic money dispensing units in which certificates are assembled in a certain sequence and number and are then dispensed through a receptacle wall. This usually involves thick-walled safes in which a dispensing opening dimensioned relatively large is made.

A requirement generally imposed in connection with these applications is that the dispensing process not be able to be interfered with by outside influences, and especially not by outside manipulations in the case of certificate receptacles. Moreover, in the case of closed receptacles, large receptacle openings should be avoided as much as possible in order not to impair the security achieved by closed containers in themselves.

The previous devices for dispensing sheet material operate with conveying arrangements which take up the sheet material between driving rollers and back pressure rollers and transfer it to other pairs of rollers until it is conveyed out through the wall opening of the receptacle. For this, because of the use of roller mechanisms, a large receptacle opening is necessarily required, which in the case of a certificate receptacle increases the danger of an outside influence being exerted.

Disclosure of the Invention

It is the problem of the invention to supply a capability of dispensing sheet material from a closed receptacle through which the receptacle opening can be designed as small as possible and the whole of the conveyor elements are conveniently accessible from the outside, so that thereby a simple construction as well as a problem-free maintenance are offered. Moreover, it must make it practically impossible for any influence or manipulation to be carried out in the inner space of the receptacle through the wall opening.

This problem is solved, for a device of the type mentioned at the start, by providing a conveying route running inclined from the receiving place to the removal place, which route is formed by endless conveyor belts lying one against another, and by having driving and/or deflector rollers of the endless conveyor belts arranged directly in front of or behind the wall opening.

By means of the principle provided by the invention, of conveying sheet material between endless conveyor belts lying one against another, it is possible to achieve a very reliable and secure conveying action and at the same time to design the wall opening of the receptacle as narrow as a slot opening, so that this is just slightly larger than the belt sides of the conveyor belts, which are to be conveyed as close to and as parallel to one another as possible. For this one must of course bear in mind that in the case of conveying a number of sheets or certificates at the same time, the size of the opening slot must be dimensioned with allowance made for the maximum height of the pile of sheet material. Since the sheet material is conveyed with endless conveyor belts lying one on another, no conveying elements such as guide or deflector rollers need be provided inside the receptacle wall or the wall opening except for the conveyor belts themselves, but rather these elements can be arranged outside of the receptacle wall, directly in front of or behind the wall opening. In this way the most important parts of the device are easily accessible and can be replaced or given maintenance in a simple way. Of especial importance is the feature of inclination of the conveying route, which, especially in regard to the use of the device with receptacles requiring security, makes any outside influence exerted on the inner space of the receptacle practically impossible. When the inclined conveyor belt runs downward from the inside to the outside, then the inner space of the receptacle must be reached through a much longer route than directly transversely to the receptacle wall. But inserting an object through this long opening slot into the inner space of the receptacle is senseless, for manipulation is impossible, since it can only be done by reversal of direction on reaching the receptacle's inner space. Since, as already explained, driving and/or deflector rollers are arranged in front of or behind the wall opening, any attempt at an outside influence on the receptacle's contents would be unsuccessful since these conveyor elements make manipulations still more difficult.

It is possible to provide the slot-like channel running inclined at an angle through the receptacle wall with a curvature lying in a vertical plane, which makes access to the internal space of the receptacle even more difficult. It is also possible to provide a second conveyor segment outside the receptacle and next to the wall opening and to achieve a curved course of this conveying route. In this way, with a suitable design of the housing for the further conveyor segment, any access to the wall opening is practically completely prevented. The construction features explained above lead to advantageous further developments of the root idea of the invention, which are characterized in detail in the subclaims. The essential features and advantages of the invention and its possible developments are described in the following on the basis of an embodiment example represented in the figures.

DETAILED DESCRIPTION OF THE SPECIFIC EMBODIMENT

Figures 1, 2:
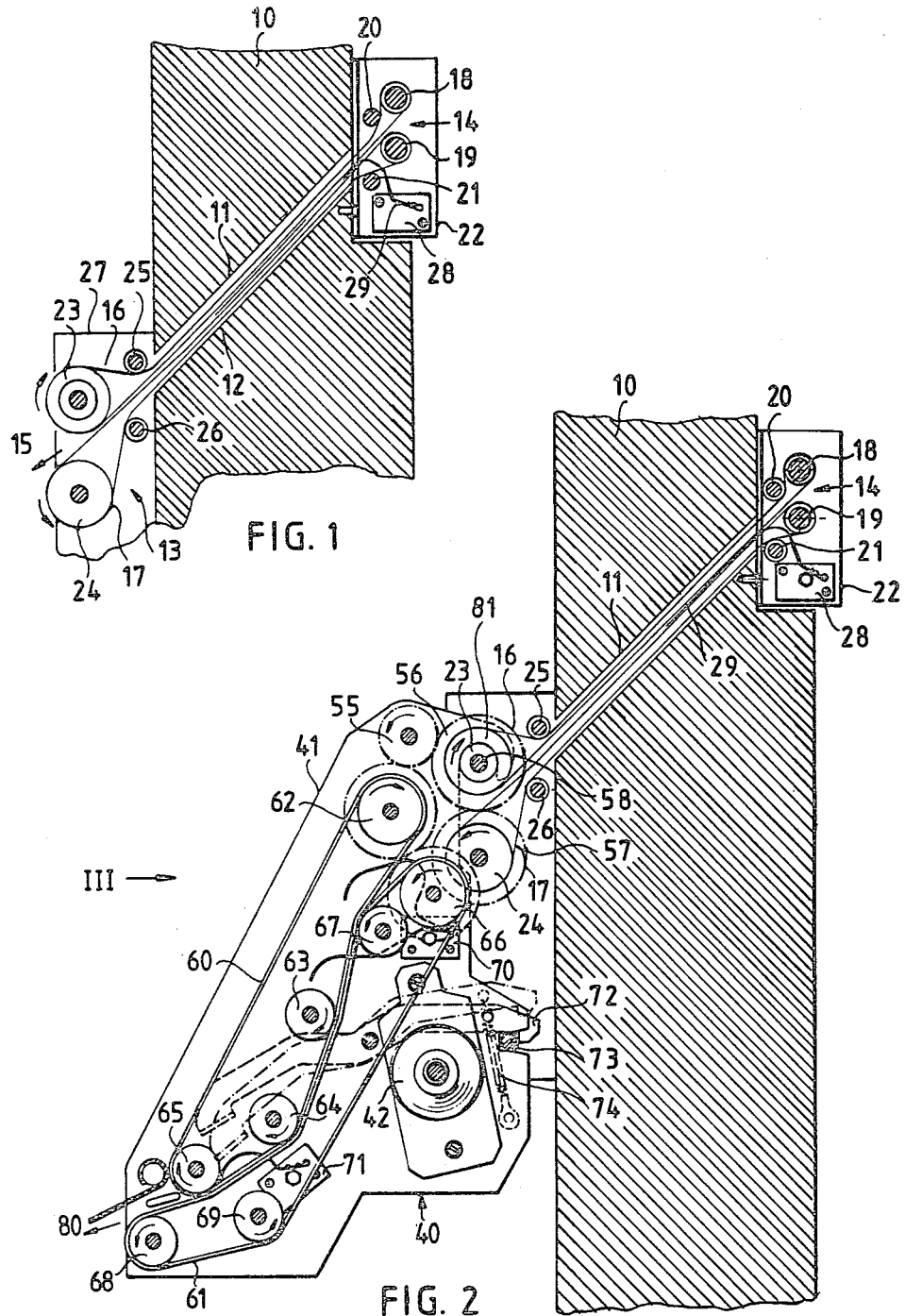
FIG. 1 shows the cross-section of a part of a receptacle wall in connection with a device according to the invention.
FIG. 2 shows the arrangement shown in FIG. 1 with a second conveyor segment additionally provided.

In FIG. 1 is represented a device for dispensing certificates 12 through the wall 10 of a safe. For this a conveyor arrangement 13 is used which conveys the certificate 12 from a receiving place 14 through the opening 11 in the wall 10 to a removal place 15.

The conveyor arrangement 13 consists of two endless conveyor belts 16 and 17 which are run through the slot-like wall opening 11 in such a way that they touch one another, which is seen especially well at the junction point of the two conveyor belts 16 and 17 between two deflector rollers 18 and 19 and at the divergence point of the two conveyor belts 16 and 17 between two deflector rollers 23 and 24. The drive of the conveyor arrangement 13 is not represented in FIG. 1 and may act on the deflector rollers 23 and 24, so that therefore it is mounted outside of the wall 10 of the safe.

The conveyor arrangement 13 is obviously constructed very simply and mounted respectively on an inner and an outer plate 22 and 27. The two endless conveyor belts 16 and 17 are in addition caused to join together directly in front of and behind the wall opening 11 by means of guide rollers 20, 21, 25 and 26 in such a way that when the conveyed article is absent, their belt sides run parallel to one another and do not quite touch the contact areas of the wall opening 11. Thus it is seen that the principle of conveying the certificates between two endless conveyor belts lying one against another leads to a very narrow slot-like wall opening 11 through which it is practically impossible to reach the interior of the receptacle.

In FIG. 1, moveover, it is represented that the conveying route has an oblique course, i.e. it is inclined downwards with respect to a vertical plane from the inner space of the receptacle to the outer space. This makes access to the inner space of the safe still more difficult, since a tool introduced perhaps into the wall opening 11 would only be able to go further upwards in the region of the receiving place 14, since any change in direction is prevented by the oblique course of the wall opening 11.

As a deviation from the straight-line course of the conveying route shown in FIG. 1, this course may also be curved in a vertical plane, whereby access to the inner space of the safe becomes practically impossible. Of course this would have the disadvantage that one of the endless conveyor belts 16 and 17 would abrade against a contact area of the wall opening 11, so that it must consist of correspondingly smooth material. But this would not interfere with the conveying action, since because of the curvature of the conveying route the certificates 12 are securely pressed by the other conveyor belt, which might consist of a material with higher static friction, onto the smoother conveyor belt.

Onto the plate 22 is fastened a microswitch 28 the actuating arm 29 of which protrudes into the conveying route and can be actuated by the certificates conveyed. From this a signal can be derived which, in connection with other features which are of no further interest here, indicates that the conveying process is in proper order or signals a conveying trouble, so that in this way the conveyor arrangement can be switched off.

FIG. 2 shows the conveyer arrangement already represented in FIG. 1 on the wall 10 of the safe, but without certificates in the conveying route. It may be seen that the actuating arm 29 of the microswitch 28 protrudes into the conveying route, since it is not acted on by conveyed articles.

In addition, FIG. 2 diagrammatically shows another conveyor segment in a sectional representation. It is formed by a conveyor unit 40, which contains as its conveyor elements two endless conveyor belts 60 and 61, which are run over deflector and guide rollers 62 to 69. These rollers are supported between two plates in accordance with known construction principles, of which one plate 41 is represented in FIG. 2. The conveyor unit 40 is suspended on the plate 27 of the conveyor arrangement already described, for which purpose it is suspended by the upper ends of the plate 41, by means of hook-shaped elements 81 on the shaft 58 of the deflector rollers 23 of the conveyor arrangement 13. In the lower region there is an anchoring of the plate 41 on a bolt 73 of the plate 27 of the conveyor arrangement 13, for which a claw element 72 is provided which is constructed as a hand lever and catches on the bolt 73 by spring tension by means of a spring 74. In FIG. 2, two different positions of the claw element 72 are shown in dot-dash lines in order to make it clear that the catching position is produced by spring tension and that the whole conveyor unit 40 can be detached from the platen 27 of the conveyor unit 13 by swinging the hand lever of the claw element 72 and then detaching the conveyor unit 40 with its hook element 81.

The two endless conveyor belts 60 and 61, through a suitable arrangement of their deflector rollers 62 to 69, have a course through which an S-shaped conveying route is achieved, so that from the receiving place 14 in the interior of the safe up to the removal place 80 shown in FIG. 2, inclusive, a conveying route results which first runs in a straight line and obliquely downward through the safe wall 10, after which the certificates arrive between the two endless conveyor belts 60 and 61 and then pass through two curvatures one after another. By means of this curved course of the second conveyor segment, any access to the wall opening 11 from the removal place 80 is practically completely prevented.

In FIG. 2 it may also be seen that due to the oblique direction of the wall opening 11 in combination with relatively large deflector rollers 18, 19, 23, 24, as well as the smaller parallel guide rollers 20, 21, 25, 26 of the first conveyor arrangement 13, deflector rollers or at least their shafts lie directly in front of or behind the wall opening 11 and prevent any unauthorized access to the wall opening 11 in the horizontal direction.

The plate 41 shown in FIG. 2 carries a driving motor 42 which does the driving of the two conveyor segments in a manner yet to be described. For this there is a drive connection with the two conveyor segments by way of a main gear 55 which belongs to the conveyor unit 40 and engages in a gear 56 which is placed on the shaft of the deflector roller 23 of the first conveyor arrangement 13. Moreover, by way of the gear 56 it drives a gear 57 which is placed on the shaft of the deflector roller 24 of the conveyor arrangement 13. Besides this there is a drive coupling of the main gear 55, in a manner yet to be described, with the deflector roller 62 of the endless conveyor belt 60, whereby the latter due to its static friction drives the endless conveyor belt 61. A corresponding static frictional coupling also exists between the two endless conveyor belts 16 and 17 of the conveyor arrangement 13.

FIG. 2, in the course of the second conveyor segment, shows further microswitches 70 and 71 the actuating arms of which protrude into the conveying route and, as already described for the microswitch 28, are actuated by the conveyed article. In this manner an unbroken monitoring of the whole conveying process over the whole conveying route is possible, and the electrical signals emitted by the microswitches 28, 70 and 71 may be used for controlling the conveying of certificates. For example it can be verified whether the microswitches are actuated and then released within a prescribed time sequence. If time errors occur, then the removal place 80 can be blocked so that it is impossible to remove erroneously assembled or conveyed certificates if any. When there is outside manipulation of one of the microswitches, an alarm signal can also be triggered.

The two conveyor segments are represented purely diagrammatically in FIGS. 1 and 2, and their elements may be arranged at different positions on the shafts in a manner familiar to one skilled in the art, although in FIG. 2 they are represented in a common plane. This is evident from considering FIG. 3, which shows an arrangement of the type shown in FIG. 2 in the direction of view III indicated there. For this the safe wall 10 is represented partly broken, in order also to make clear the assignment of the separate parts to the inside of the safe wall 10.

Figure 3:
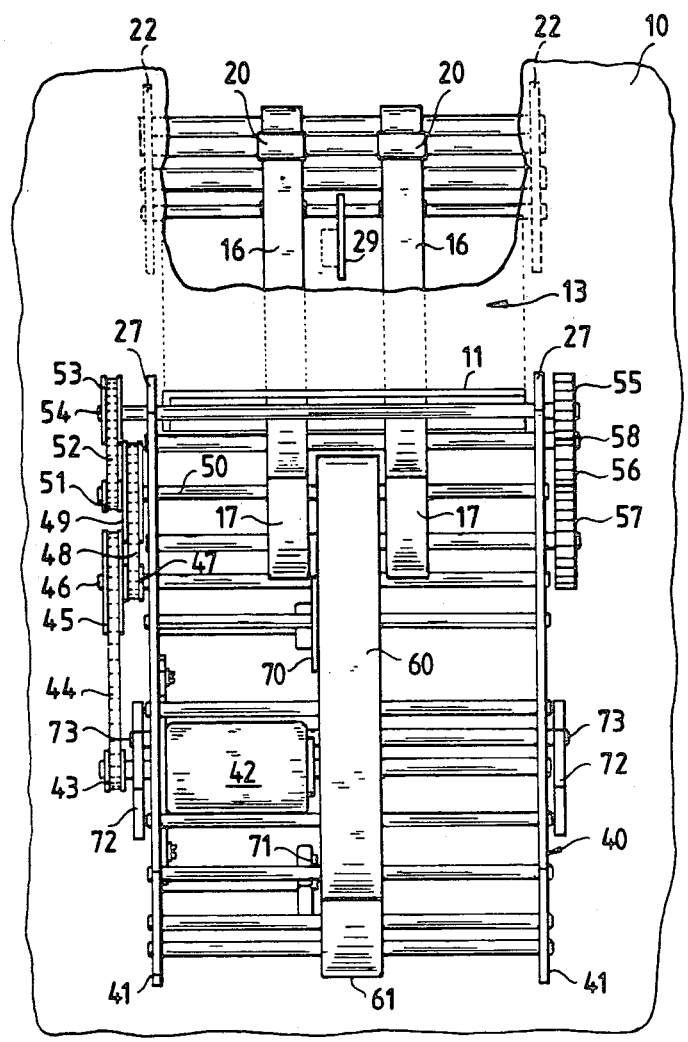
FIG. 3 shows a view of the device shown in FIG. 2 in view direction III indicated there.

As already explained, the rollers provided for moving and guiding the endless conveyor belts 16, 17, 60 and 61 and their shafts are supported between two plates 22 and 27 respectively. FIG. 3 reveals that two pairs of endless conveyor belts 16 and 17 are provided for the conveyor arrangement 13, which belts grasp the certificates 12 (FIG. 1) over a relatively large width, so that they are reliably conveyed through the slot-like wall opening 11. Outside the safe wall the certificates are then conveyed further by only two endless conveyor belts 60 and 61, although here too a plurality of pairs of endless conveyor belts may be provided. The two endless conveyor belts 60 and 61 are visibly aligned with the intermediate space between the two pairs of endless conveyor belts 16 and 17 of the conveyor arrangement 13.

The driving motor 42 for the whole device is mounted on the left plate 41 of the conveyor unit 40 and drives a gear 43 which, by way of a cogged belt 44, turns another gear 45. This is coupled, by way of its shaft 46 and a gear 47 as well as another cogged belt 48, with a gear 49 on a shaft 50, which in turn is coupled by way of a gear 51 and a cogged belt 52 with a gear 53. This drive transmission is so dimensioned that the shaft 54 rotates with a suitable rotation speed and direction so that the main gear 55 provided at the other end of the shaft 54 can engage, in a manner already described, in the gear 56 placed on the shaft 58 for the deflector roller 23 of the endless conveyor belt 16 of the conveyor arrangement 13. Moreover, a coupling of the gear 56 with a gear 57 is shown, which is placed on the shaft of the deflector roller 24 of the other endless conveyor belt 17 of the conveying arrangement 13. But also the mutual static friction between the endless conveyor belts 16 and 17 alone may be enough to make possible a satisfactory driving of the conveyor arrangement 13. The driving of both pairs of conveyor belts 16, 17 ensures that no mutual displacement between the pairs of conveyor belts occurs due to differing slippage, which would lead to an oblique running of the conveyed article.

FIG. 3 also shows the assignment of the microswitch-actuating arms 29, 70 and 71 to the respective conveying route. Besides this, it is particularly clearly seen in what way the conveyor elements block access to the slot-like and very small wall opening 11.

We claim:

1. Device for dispensing sheet material out of a closed receptacle, especially for dispensing certificates through the wall of a safe by means of a conveyor arrangements which conveys the sheet material from a receiving place inside the receptacle, through a wall opening, and out to a removal place outside the receptacle, characterized that a conveying route running inclined from the receiving place (14) to the removal place (15) is provided, which route is formed by endless conveyor belts (16,17) lying one against another, and that driving and/or deflector rollers (18,19,23,24) of the endless conveyor belt (16,17) are arranged directly adjacent the wall opening (11).

2. Device as claimed in claim 1, characterized in that the conveying route is at least partially curved in a vertical plane.

3. Device as claimed in claim 1, characterized in that a first conveying sgement (13) with endless conveyor belts (16,17) lying one against another in pairs is run through the wall opening (11) and that the deflector rollers (18, 19, 23, 24) carrying the endless conveyor belts (16,17) are arranged on the inside and the outside directly next to the wall opening (11).

4. Device as claimed in claim 3, characterized in that two pairs of endless conveyor belts (16,17) are arranged adjacent to one another and spaced apart.

5. Device as claimed in claim 3, characterized in that the deflector rollers (18,19,23, 24) of the endless conveyor belts (16,17) conveyed through the wall opening (11) have a diameter greater than the height of the opening, and that between the deflector rollers (18,19,23,24) and the wall opening are arranged guide rollers (20,21,25,26) which bring about a parallel conveying of all conveyor belt sides within the wall opening (11).

6. Device as claimed in claim 3, characterized in that a second conveyor segment (40) is provided with a pair of endless conveyor belts (60,61) lying one against another outside of the receptacle wall (10) and next to the first conveyor segment (13).

7. Device as claimed in claim 6, characterized in that the first and the second conveyor segment (13,40) show a common driving mechanism (42) on the outside of the receptacle.

8. Device as claimed in claim 6, characterized in that the second conveyor segment (40) is formed as a conveyor unit attached releasably onto the outside of receptacle wall (10).

9. Device as claimed in claim 8, characterized in that the conveyor unit with hook elements (81) provided on both sides is suspended on a deflector roller shaft (58) of the first conveyor segment (13) and additionally shows a manually releasable stop mechanism (72,73,74) for anchoring on the receptacle wall (10).

10. Device as claimed in claim 9, characterized in that the conveyor unit in its suspended state is coupled by way of a gear coupling (55,56) with the first conveyor segment (13).

11. Device as claimed in claim 2, characterized in that the second conveyor segment (40) shows the curved conveying route.

12. Device as claimed in claim 11, characterized in that the curvature of the conveying route is S-shaped.

13. Device as claimed in claim 6, characterized in that the endless conveyor belts (60,61) of the second conveyor segment (40), seen in the conveying direction, are aligned with the center of the space of the pair of conveyor belts (16,17) of the first conveyor segments (13).

14. Device as claimed in claim 4, characterized in that the second conveyor segment (40) shows two endless conveyor belts (60,61).

15. Device as claimed in claim 1, characterized in that a plurality of electric switches (28,70,71) actuatable by the sheet material which is being moved are assigned to the conveying route.

* * * * *